(12) United States Patent
Iorio

(10) Patent No.: US 12,135,919 B2
(45) Date of Patent: Nov. 5, 2024

(54) GOAL-DRIVEN COMPUTER AIDED DESIGN WORKFLOW

(71) Applicant: AUTODESK, INC., San Francisco, CA (US)

(72) Inventor: Francesco Iorio, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 0 days.

(21) Appl. No.: 18/158,406

(22) Filed: Jan. 23, 2023

(65) Prior Publication Data

US 2023/0161921 A1    May 25, 2023

Related U.S. Application Data

(63) Continuation of application No. 16/940,290, filed on Jul. 27, 2020, which is a continuation of application
(Continued)

(51) Int. Cl.
*G06F 30/00* (2020.01)
*G06F 30/12* (2020.01)
(Continued)

(52) U.S. Cl.
CPC .............. *G06F 30/00* (2020.01); *G06F 30/12* (2020.01); *G06F 30/13* (2020.01); *G06F 2111/20* (2020.01)

(58) Field of Classification Search
CPC .......... G06F 30/00; G06F 30/13; G06F 30/12; G06F 2111/20
(Continued)

(56) References Cited

U.S. PATENT DOCUMENTS 6,545,680 B1 * 4/2003 Delas ................. G05B 19/4097
345/419
6,789,054 B1 * 9/2004 Makhlouf ................ G06F 8/10
703/22
(Continued)

OTHER PUBLICATIONS

Final Office Action received for U.S. Appl. No. 16/940,290 dated Jul. 20, 2023, 16 pages.
(Continued)

*Primary Examiner* — Cedric Johnson
(74) *Attorney, Agent, or Firm* — Artegis Law Group, LLP

(57) ABSTRACT

A centralized design engine receives a problem specification from an end-user and classifies that problem specification in a large database of previously received problem specifications. Upon identifying similar problem specifications in the large database, the design engine selects design strategies associated with those similar problem specifications. A given design strategy includes one or more optimization algorithms, one or more geometry kernels, and one or more analysis tools. The design engine executes an optimization algorithm to generate a set of parameters that reflect geometry. The design engine then executes a geometry kernel to generate geometry that reflects those parameters, and generates analysis results for each geometry. The optimization algorithms may then improve the generated geometries based on the analysis results in an iterative fashion. When suitable geometries are discovered, the design engine displays the geometries to the end-user, along with the analysis results.

20 Claims, 11 Drawing Sheets

Related U.S. Application Data

No. 15/635,149, filed on Jun. 27, 2017, now Pat. No. 10,747,913, which is a continuation of application No. 14/091,075, filed on Nov. 26, 2013, now Pat. No. 9,690,880.

(60) Provisional application No. 61/730,473, filed on Nov. 27, 2012.

(51) Int. Cl.
  *G06F 30/13* (2020.01)
  *G06F 111/20* (2020.01)

(58) Field of Classification Search
  USPC .............................................. 703/1
  See application file for complete search history.

(56) References Cited

U.S. PATENT DOCUMENTS

| | | | |
|---|---|---|---|
| 7,552,032 | B2 | 6/2009 | Krishnapillai |
| 9,315,663 | B2 | 4/2016 | Appleby et al. |
| 10,361,802 | B1 | 7/2019 | Hoffberg-Borghesani et al. |
| 2004/0210429 | A1 | 10/2004 | Yu et al. |
| 2006/0036977 | A1 | 2/2006 | Cohn et al. |
| 2008/0221845 | A1 | 9/2008 | Yu et al. |
| 2010/0111370 | A1 | 5/2010 | Black et al. |
| 2010/0199257 | A1 | 8/2010 | Biggerstaff |
| 2012/0143364 | A1* | 6/2012 | Mcleod .................. A61C 5/77 700/98 |
| 2012/0167029 | A1 | 6/2012 | Cohn et al. |
| 2012/0173209 | A1* | 7/2012 | Krebs .................. G06F 30/13 703/1 |
| 2013/0325413 | A1 | 12/2013 | Kapstan et al. |
| 2014/0149084 | A1 | 5/2014 | Iorio |
| 2015/0104188 | A1 | 4/2015 | Norman et al. |

OTHER PUBLICATIONS

Non Final Office Action received for U.S. Appl. No. 16/940,290 dated Feb. 1, 2024, 16 pages.

Final Office Action received for U.S. Appl. No. 16/940,290 dated Aug. 14, 2024, 18 pages.

\* cited by examiner

GOAL-DRIVEN COMPUTER AIDED DESIGN WORKFLOW

CROSS-REFERENCE TO RELATED APPLICATIONS

This application is a continuation of the U.S. patent application titled, "GOAL-DRIVEN COMPUTER AIDED DESIGN WORKFLOW," filed on Jul. 27, 2020 and having Ser. No. 16/940,290, which is a continuation of U.S. patent application titled, "GOAL-DRIVEN COMPUTER AIDED DESIGN WORKFLOW' filed on Jun. 27, 2017 and having Ser. No. 15/635,149, issued as U.S. Pat. No. 10,747,913, which is a continuation of U.S. patent application titled, "GOAL-DRIVEN COMPUTER AIDED DESIGN WORK-FLOW," filed on Nov. 26, 2013 and having Ser. No. 14/091,075, issued as U.S. Pat. No. 9,690,880, which claims priority benefit of the United States Provisional Application titled "GOAL-DRIVEN COMPUTER AIDED DESIGN WORK-FLOW," filed Nov. 27, 2012 and having Ser. No. 61/730,473. The subject matter of these related applications is hereby incorporated herein by reference.

BACKGROUND OF THE INVENTION

Field of the Invention

The present invention generally relates to computer aided design and, more specifically, to goal-driven computer aided design workflows.

Description of the Related Art

In a conventional design workflow, a designer begins by conceptualizing geometry that reflects a set of requirements or specifications. The designer then uses a computer-aided design tool to model the conceptualized geometry. The geometry could represent a mechanical component, and electrical element, a structural member, a fluid connector, or any other type of object intended to serve some functional or aesthetic purpose. Once the designer has modeled the geometry, a team of analysis experts performs different types of analyses to evaluate the performance of the geometry in a variety of different contexts. For example, if the geometry corresponds to a truss in a bridge, then a structural engineer could perform a stress analysis to determine whether the geometry is capable of withstanding certain expected loads. In parallel, an aerodynamicist could perform an aerodynamics simulation with the truss to determine whether the aerodynamic properties of the truss fall within the set of specifications.

The various analysis experts then propose changes to the geometry that would cause the geometry to better fit the specifications. Since the proposed changes are derived from the type of simulation performed, oftentimes, different analysis experts may propose different, and potentially competing, changes to the geometry. The designer then modifies the geometry in an attempt to satisfy the various changes proposed by the analysis experts. This process generally corresponds to a "design cycle" in a conventional design workflow. Many such design cycles may be required before a geometry is created that meets the set of specifications. Typically, this process is iterative and occurs as incremental modifications to the computer model drawn to represent the geometry.

One problem with this approach is that designers must rely on intuition and experience when drawing geometries because the spectrum of all possible design options is potentially infinite. Consequently, designers may be prone to rehashing old designs. A designer may intentionally start with a geometry derived from past experience, or may subconsciously create a model of a geometry that resembles a previous geometry. In either case, in novel situations with complex and unique requirements, those old designs may be sub-optimal. Since the old designs provide a starting point for the iterative process described above, that process is often limited by initial design choices. These difficulties are compounded by the fact that design changes proposed by the different analysis experts may contradict one another. Another problem with the approach described above is that, due to time constraints, only a finite number of design-analysis cycles are possible before the design must be manufactured and put into practice. As such, many sub-optimal designs may be finalized simply because the designer has run out of time.

As the foregoing illustrates, what is needed in the art is a more effective approach to creating geometry.

SUMMARY OF THE INVENTION

One embodiment of the present invention sets forth a computer-implemented method for generating geometry, including receiving a design specification for a physical component that defines a set of requirements that the physical component should meet, identifying a stored design strategy within a design space based on the design specification, executing the stored design strategy to generate a geometry that reflects the design specification, evaluating one or more physical characteristics of the geometry to confirm that the geometry meets the set of requirements defined by the design specification, and displaying the geometry to an end-user.

One advantage of the disclosed technique is that geometries generated in the aforementioned fashion may be more likely to achieve global optima compared to traditional approaches.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
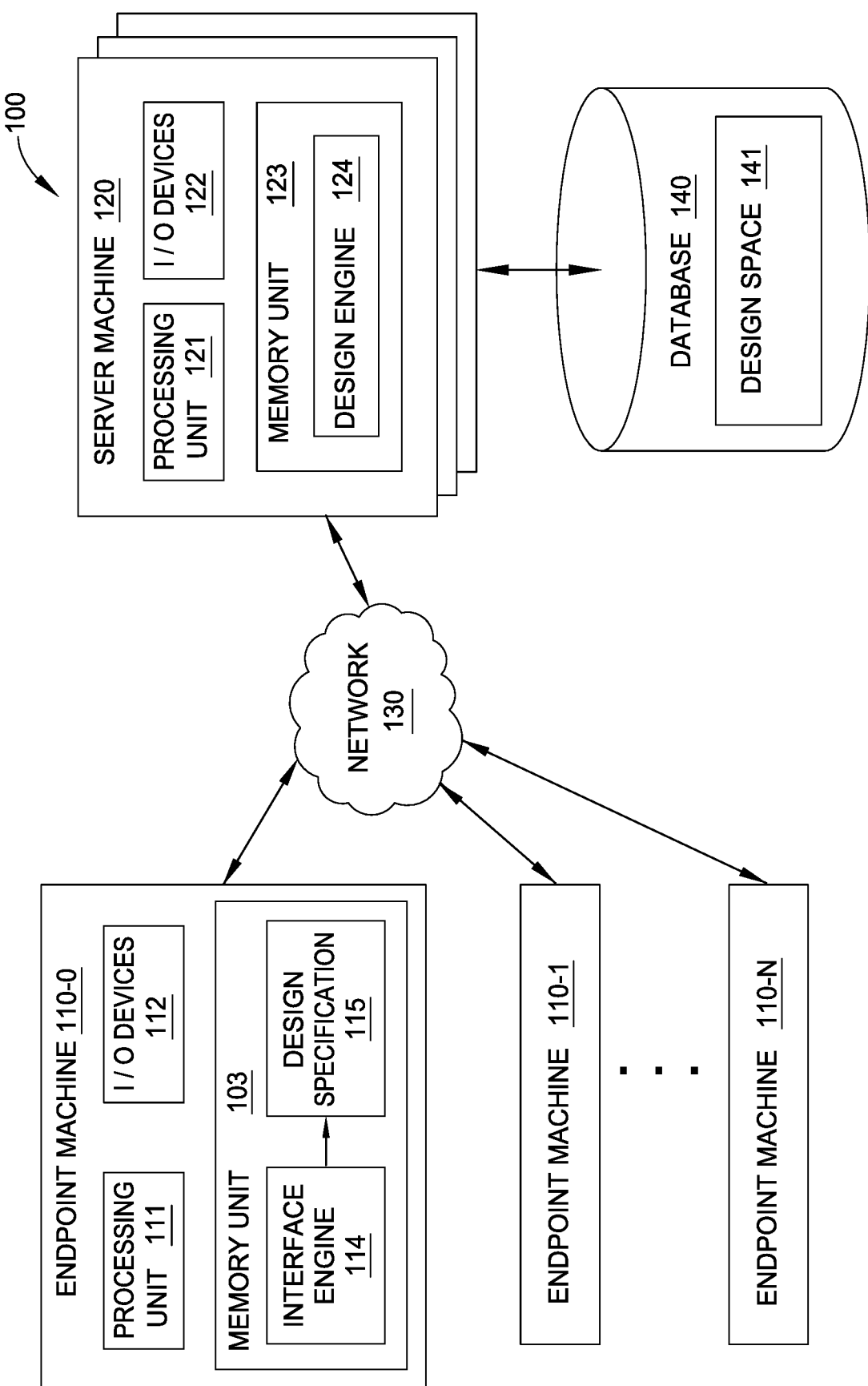
FIG. 1 illustrates a system configured to implement one or more aspects of the present invention.

FIG. 1 illustrates a system 100 configured to implement one or more aspects of the present invention. As shown, system 100 includes endpoint machines 110-0 through 110-N coupled to a server machine 120 by a network 130. Server machine 120 is also coupled to a database 140. Endpoint machines 110-0 through 110-N (referred to generally as endpoint machines 110), represent client computing devices configured to interact with server machine 120 in order to generate geometry as part of a goal-driven computer-aided design workflow. In the context of this disclosure, "geometry" refers to any multi-dimensional model of a physical structure, including CAD models, meshes, and point clouds, as well as circuit layouts, piping diagrams, free-body diagrams, and so forth. Each endpoint machine 110 may be a desktop computing device, a laptop computing device, or another type of remote client computing device. Endpoint machine 110-0 represents an exemplary instance of an endpoint machine 110, the details of which are described in greater detail below.

Endpoint machine 110-0 includes a processing unit 111, input/output (I/O) devices 112, and a memory unit 103 coupled to one another. Memory unit 103 includes an interface engine 114 and a design specification 115. Processing unit 111 may be any technically feasible hardware unit capable of processing data, including a central processing unit (CPU), graphics processing unit (GPU), and so forth. I/O devices 112 may include devices capable of receiving input, including a keyboard, mouse, etc., devices capable of generating output, including a display device, speaker, etc., and devices capable of receiving input and generating output, including a touchscreen, universal serial bus (USB) port, etc. Memory unit 103 is a storage device capable of storing software applications that may be executed by processing unit 111, such as interface engine 114, as well as data generated by processing unit 111, such as design specification 115.

Interface engine 114 may be executed by processing unit 111 to generate an interface, such a graphical user interface (GUI), with which an end-user of endpoint machine 110-0 may interact in order to define a design problem for which geometry should be generated. Interface engine 114 could be a desktop software application, a client-side web application, a web browser configured to display a web page, or any other technically feasible client-side software program. Interface engine 114 receives various data from the end-user that reflects different attributes of the design problem, including a specific set of objectives that the geometry should meet, an environment with which the geometry should be capable of operating, a set of constraints that limit the geometry, and a set of style cues that indicate various non-functional aesthetics that the geometry should incorporate. Interface engine 114 then generates design specification 115 to include the aforementioned data. Generally, design specification 115 could be any data structure that reflects a design problem to be solved via geometry. Interface engine 114 is configured to transmit design specification 115 to server machine 120. Server machine 120 may then generate one or more different geometries that reflect design specification 115.

Server machine 120 is a computing device that may reside within a datacenter that also includes other, similar instances of server machine 120. Server machine 120 includes a processing unit 121, I/O devices 122, and a memory unit 123 coupled to one another. Processing unit 121, I/O devices 122, and memory unit 123 represent generic computer components that may be similar in nature to processing unit 111, I/O devices 112, and memory unit 103, respectively. Memory unit 123 includes a design engine 124 that, when executed by processing unit 121, attempts to generate geometry that reflects design specification 115. In doing so, design engine 124 is configured to interact with database 140 to access design strategies previously implemented to generate geometries for past design specifications.

Database 140 is a storage device configured to store large amounts of data. Database 140 may reside within the same datacenter that includes server machine 120 or may reside elsewhere. Database 140 includes a design space 141 that represents a mapping between previously received design specifications and the different design strategies used to generate geometry for those design specifications. Each such design strategy includes one or more optimization algorithms configured to generate a set of parameters that define a geometry based on problem specification 115. Each design strategy also includes one or more geometry kernels configured to procedurally generate geometry based on that set of parameters, as well as one or more analysis tools configured to analyze the performance of generated geometry in a variety of different contexts. The contents of design space 141 are described in greater detail below in conjunction with FIG. 2, and an exemplary design strategy is described in greater detail below in conjunction with FIG. 3.

Design engine 124 is configured to classify design specification 115 by mapping that design specification to similar design specifications stored within design space 141. In doing so, design engine 124 may implement any comparative algorithm to determine a correlation value between design specification 115 and each stored design specification included in design space 141. The comparative algorithm could be a distance function, among other possibilities. Design engine 124 then selects design strategies associated with the stored design specifications with which problem specification 115 is most strongly correlated. The classification functionality described briefly above is also described in greater detail below in conjunction with FIGS. 4-5.

Once a design strategy or strategies have been selected, design engine 124 then executes the optimization algorithms included within those design strategies to begin exploring an N-dimensional design space associated with design specification 115. The N-dimensional design space generally reflects all possible combinations of parameters a design could have, and a given point within that N-dimensional design space represents a particular combination of those parameters. Design engine 124 then executes the geometry kernels included in the design strategies to generate geometry that represents different points in the N-dimensional design space. Design engine 124 then analyzes the generated geometry using analysis tools also included in the selected design strategies to identify optimal geometries. An "optimal" geometry could, for example, represent a particular tradeoff between meeting design objectives and avoiding the violation of design constraints. Design engine 124 typically implements the above functionality iteratively in order to identify optimal geometries. The design strategy execution functionality described briefly above is also described in greater detail below in conjunction with FIGS. 6-7.

Conceptually, design engine 124 is configured to generate a spectrum of geometries via repeated optimization passes that reflect a wide variety of different design choices associated with a design problem. Design engine 124 is further configured to analyze the performance of each such geometry in the spectrum to analyze various tradeoffs between design characteristics. With this approach, many potential solutions to the design problem can be generated and analyzed, allowing the end-user to review and compare the feasibility of many more designs than possible with conventional design workflows. Further, since each design cycle can be performed in a highly parallel cloud-based environment, a given design cycle may involve the execution of many designs strategies simultaneously, which may occur in just a fraction of the time needed to perform a conventional design cycle, allowing the end-user to perform many such cycles.

Figure 2:
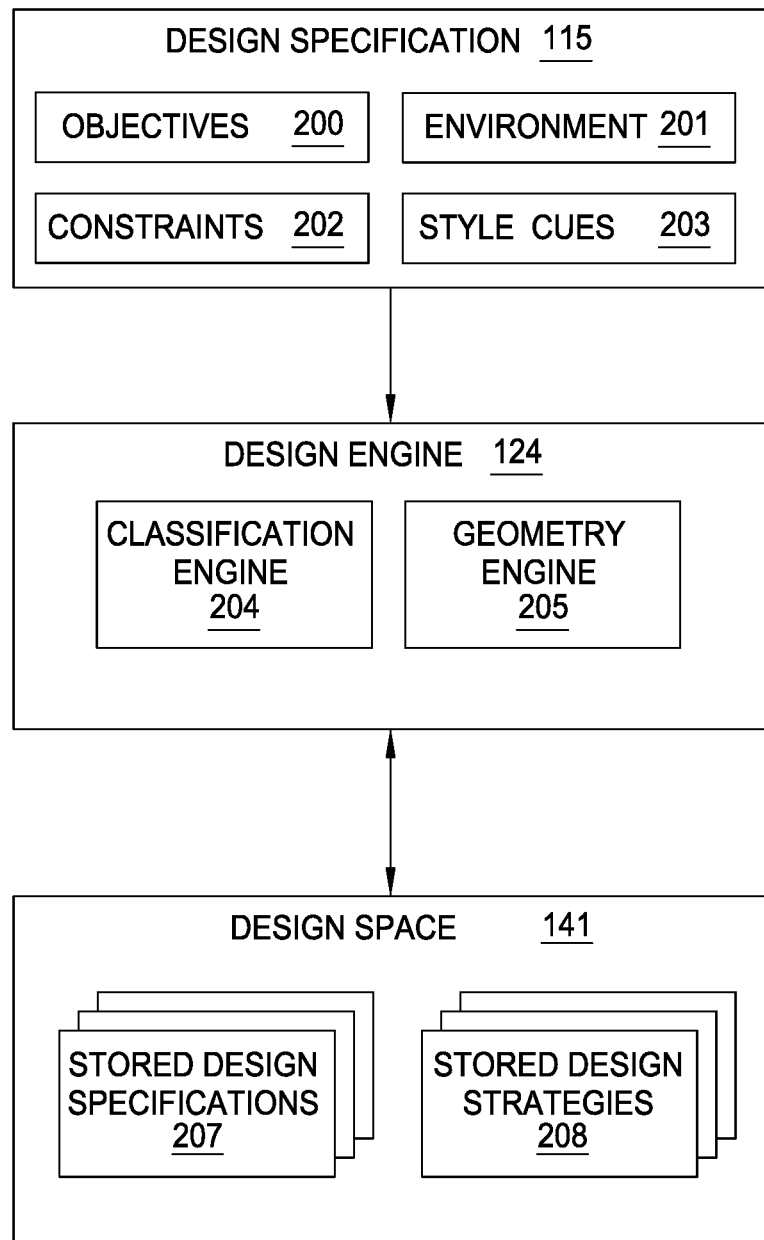
FIG. 2 illustrates data that is processed by the design engine of FIG. 1 to generate geometry that reflects a design specification, according to one embodiment of the present invention.

FIG. 2 illustrates data that is processed by the design engine of FIG. 1 to generate geometry that reflects a design specification, according to one embodiment of the present invention. As shown, design engine 124 receives design specification 115 and maps that design specification into deign space 141, as described above in conjunction with FIG. 1. Design specification 115 includes different attributes of a design problem for which geometry is to be generated, such as objectives 200, environment 201, constraints 202, and style cues 203.

Figure 5:
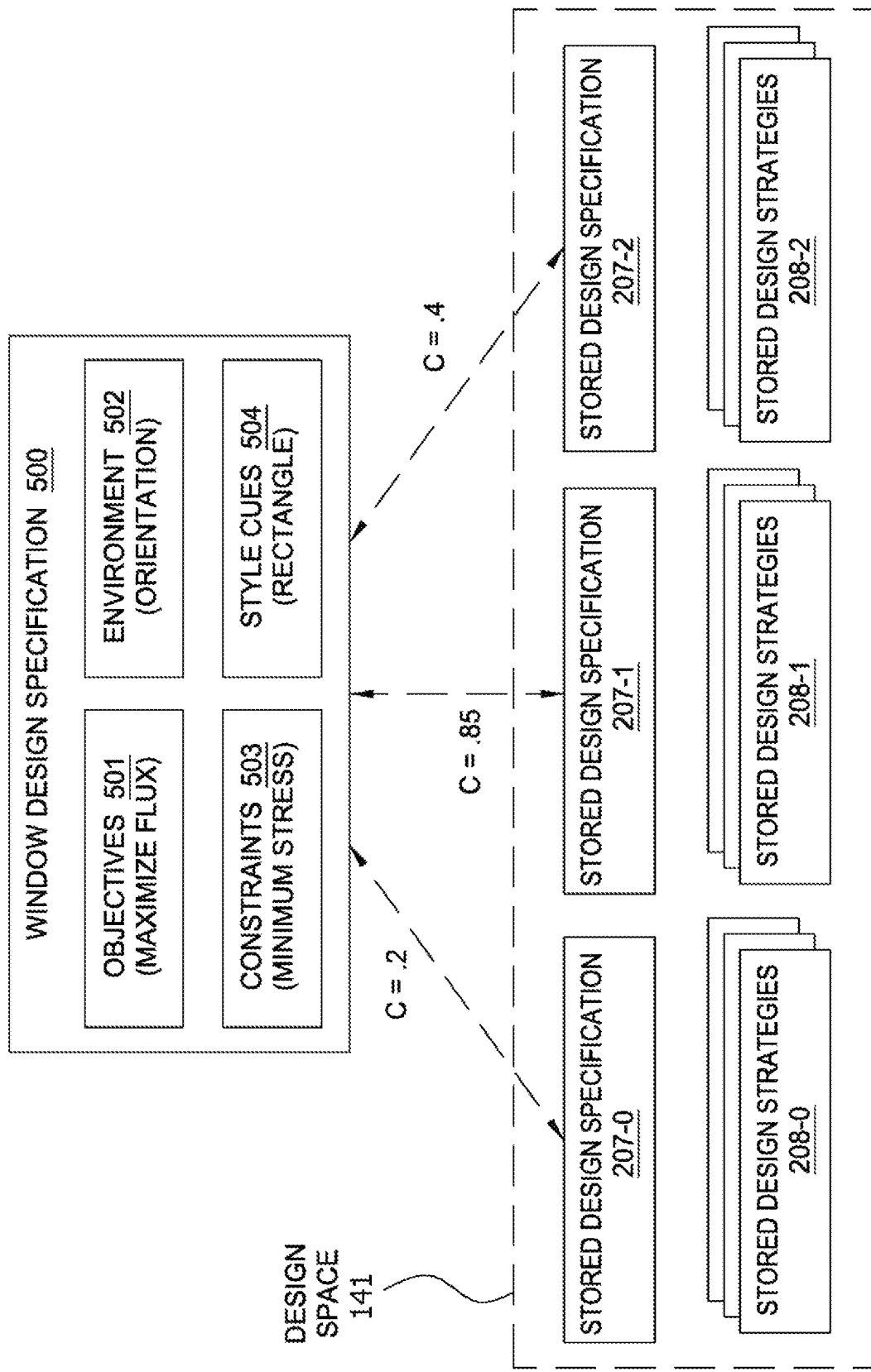
FIG. 5 illustrates an exemplary design specification that is correlated with stored design specifications residing within the design space of FIG. 1, according to one embodiment of the present invention.
Figure 7:
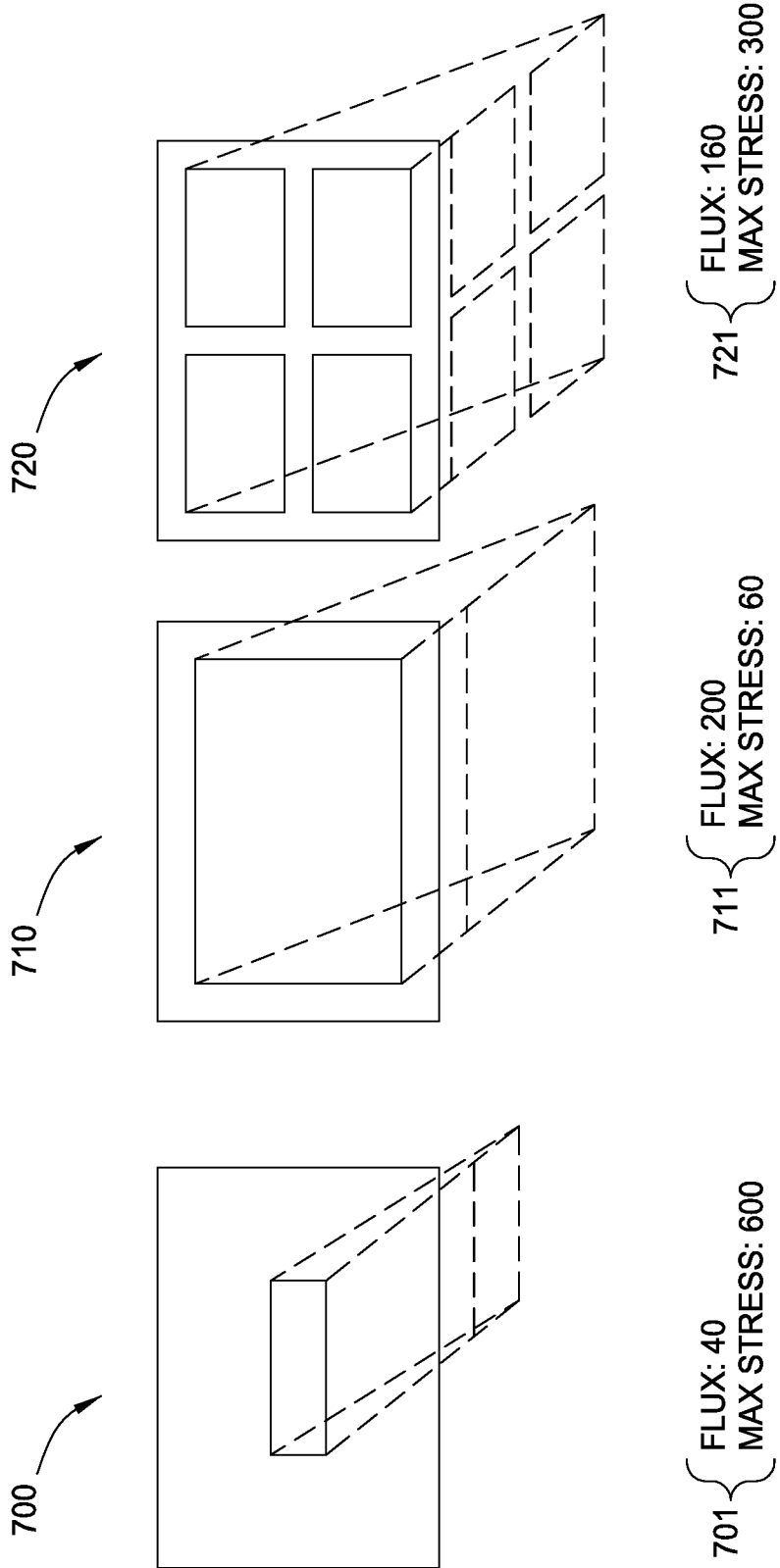
FIG. 7 illustrates exemplary geometries that meet a design specification, according to one embodiment of the present invention.

Objectives 200 represent specific design goals that geometry generated by design engine 124 should meet. For example, if a structure to be designed is a window, then design objectives could indicate that the flux of light associated with window designs generated by design engine 124 should be maximized. Environment 201 indicates particular attributes of the environment where geometry generated by design engine 124 may be implemented. Referring to the window example mentioned above, environment 201 could indicate a particular location and/or orientation within a building where the window is to be placed. Constraints 202 include specific limitations on geometries generated by design engine 124. In the aforementioned window example, constraints 202 could indicate a minimum amount of stress that window designs must endure. Style cues 203 include aesthetic themes that the end-user prefers be incorporated into geometries generated by design engine 124. In the window example, style cues 203 could indicate that the window should have a specific shape. Style cues 203 may include reference geometry that any generated geometries should resemble, among other possibilities. FIGS. 5 and 7, described in greater detail below, expand further on the window example discussed above.

Design engine 124 is configured to parse design specification 115 and interpret the various data sets included in that design specification. In doing so, design engine 124 may implement natural language processing, semantic analysis, and other forms of computer-implemented interpretation in order to pre-process design specification 115 into a data structure having a particular mathematical format and a particular set of mathematical entities.

Once design engine 124 pre-processes design specification 115 in the fashion described above, a classification engine 204 within design engine 124 is configured to map design specification 115 into design space 141. Design space 141 includes a collection of stored design specifications 207 and a corresponding collection of stored design strategies 208. Each stored design specification 207 is associated with a design problem for which design engine 124 previously generated geometry. Each stored design strategy 208 represents a previously implemented strategy for generating that geometry.

Classification engine 204 is configured to map design specification 115 into design space 141 by generating a correlation value between design specification 115 and each stored design specification 207 within design space 141. Classification engine 204 may then identify stored design specifications 207 that are similar to design specification 115. For example, classification engine 204 may identify stored design specifications 207 having a threshold correlation value with design specification 115. Classification engine 204 then retrieves the stored design strategy (or strategies) 208 associated with the identified design specifications 207 for execution.

In practice, classification engine 204 classifies design specification 115 by computing a distance value between design specification 115 and each stored design specification 207 within design space 141. Classification engine 204 then identifies a number of stored design specifications 207 within a threshold distance of design specification 115. The threshold itself could be generated, for example, based on a level of uncertainty that the end-user specifies or based on the density of the region of design space 141 where problem specification 115 falls. Classification engine 204 may identify just one stored design specification 207 that falls very close to design specification 115, or collect multiple stored design specifications 207 residing farther from design specification 115. In situations where classification engine 204 fails to identify any stored design specifications 207 within the threshold distance of design specification 115, classification engine 204 may simply select all stored design strategies 207 in design space 141 for execution.

As previously mentioned, the classification approach implemented by classification engine 204 is described in greater detail below in conjunction with FIGS. 4-5. Once classification engine 204 identifies one or more stored design strategies 208, execution engine 205 then executes those identified design strategies to generate geometry that reflects design specifications 115. An exemplary stored design strategy 208 is described in greater detail below in conjunction with FIG. 3.

Figure 3:
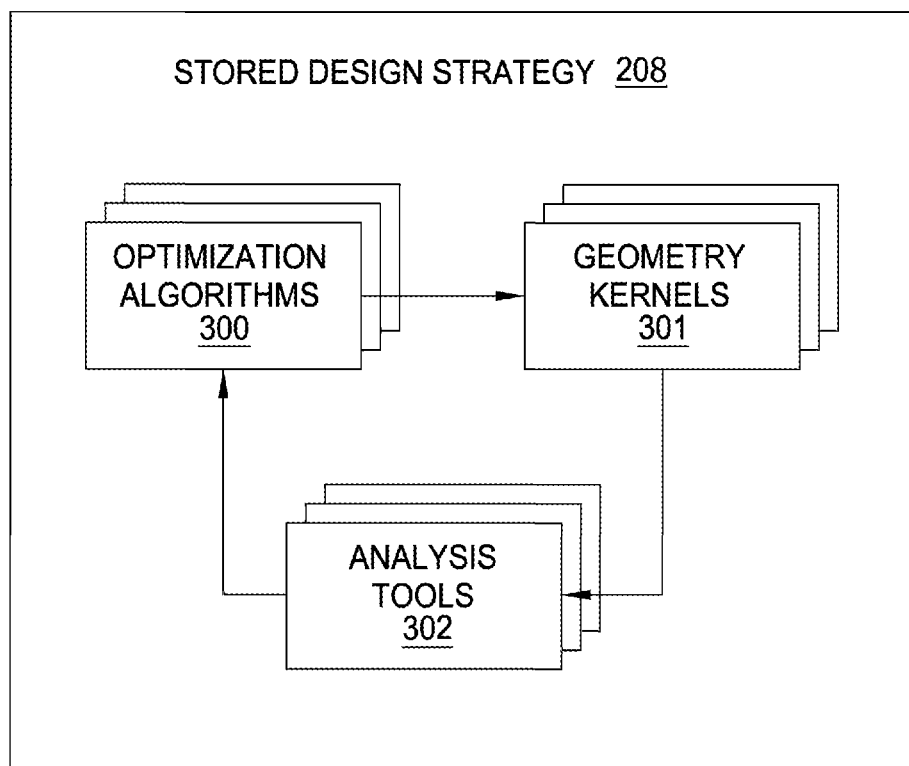
FIG. 3 illustrates a design strategy that may be executed by the server machine of FIG. 1 to generate geometry that reflects a design specification, according to one embodiment of the present invention.

FIG. 3 illustrates a stored design strategy 208 that may be executed by server machine 120 of FIG. 1 to generate geometry that reflects design specification 115, according to one embodiment of the present invention. As shown, stored design strategy 208 incudes one or more optimization algorithms 300, one or more geometry kernels 301, and one or more analysis tools 302.

Optimization algorithms 300 can be executed by design engine 124 to explore the N-dimensional design space associated with problem specification 115. As mentioned above, each point in that N-dimensional design space corresponds to a particular combination of parameters. A given combination of parameters describes the physical shape and size of geometry that reflects design specification 115. For example, a set of parameters could define the profile of a wing design. In practice, optimization algorithms 300 may include any technically feasible approach for generating combinations of parameters that meet objectives 200 within the context of environment 201 without violating constraints 202. An optimization algorithm 300 generates a set of parameters and then passes that set of parameters to geometry kernels 301.

Geometry kernels 301 include various algorithms for generating geometry based on the set of parameters received from optimization algorithms 300. In particular, each geometry kernel 301 sets forth procedural techniques for adding material to and/or removing material from a three-dimensional (3D) space. For example, a given geometry kernel 301 could represent a technique for adding voxels to a sparsely populated voxel space and/or removing voxels from a densely populated voxel space. Geometry kernels 301 may also set forth manufacturing techniques derived from real-world manufacturing processes. For example, a given geometry kernel 301 could represent a lathe manufacturing technique where material would be removed from geometry along a radially symmetric path. As a general matter, geometry kernels 301 may reflect any computer-implemented technique for generating and/or modifying a 3D model of a structure. Various properties and characteristics of geometry generated by geometry kernels 301 may be analyzed using analysis tools 302.

Analysis tools 302 include tools for analyzing the performance of a given geometry in a variety of different scenarios. Analysis tools 302 may include physical simulation programs, design validation packages, and other design evaluation engines. The specific collection of analysis tools 302 included within stored design strategy 208 may be derived from the class of design problem associated with the stored design specification 207 for which stored design strategy 208 was previously implemented. For example, if stored design specification 207 relates to a fluid dynamics problem, then analysis tools 302 within stored design strategy 208 could include one or more computational fluid dynamics (CFD) simulation tools. Alternatively, if the stored design specification 207 relates to a structural design problem, then analysis tools 302 could include one or more structural simulation packages.

In practice, a given design problem may fall within several different classes, and analysis tools 302 may include one or more different evaluation engines for each different class. The particular collection of analysis tools 302 may also be derived from the specific objectives, environment, constraints, and style cues set forth within the stored design specification 207 for which stored design strategy 208 was previously implemented. For example, if the objectives included within a given stored design specification 207 indicate that the mass of geometry generated via geometry kernels 301 should be minimized, then stored design strategy 208 could include an analysis tool 302 that determines the mass of that geometry. As a general matter, analysis tools 302 are configured to implement any technically feasible approach to determining the degree to which a given geometry meets a particular design specification.

Analysis tools 302 generate performance data using the aforementioned evaluation techniques and then feed that data back into optimization algorithms 300. Optimization algorithms 300 may rely on that performance data in order to further explore the N-dimensional design space. For example, an optimization algorithm 300 could be a gradient descent algorithm, and upon determining that the performance of generated geometries has improved when a particular parameter is increased, the optimization algorithm could continue to increase those parameters. With this approach, optimization algorithms 300 are configured to identify the sensitivity of generated geometries to changes in parameters, and to modify those geometries based on identified sensitivities to improve performance. Many cycles of the feedback process described herein could occur before execution engine 205 generates a geometry that meets design specification 115.

Referring back now to FIG. 2, once classification engine 204 selects one or more stored design strategies 208, execution engine 205 executes those stored design strategies 207 in the iterative fashion described above to generate a range of geometries that meet design specification 115. With this approach, classification engine 204 and execution engine 205 are configured to interoperate to achieve the general functionality of design engine 124. Once a spectrum of feasible designs has been identified through the above techniques, design engine 124 may interact with interface engine 114 to display those designs to the end-user using various visualization techniques. Some such techniques are described in greater detail below in conjunction with FIGS. 8A-9. The end-user may then modify design specification 115 and initiate another design cycle, select favored designs for further analysis, or otherwise implement design engine 124 to explore potential design options.

Once the end-user has selected a final geometry or set of geometries, design engine 124 updates design space 141 to include problem specification 115. Design engine 124 also updates design space 141 to include data indicating the specific stored design strategies implemented to generate the geometries that reflect design specification 115. With this approach, design engine 124 continuously updates design space 141 with new design specifications and successfully implemented design strategies, thereby allowing that design space 141 to evolve and improve over time.

Classifying a Design Specification

Figure 4:
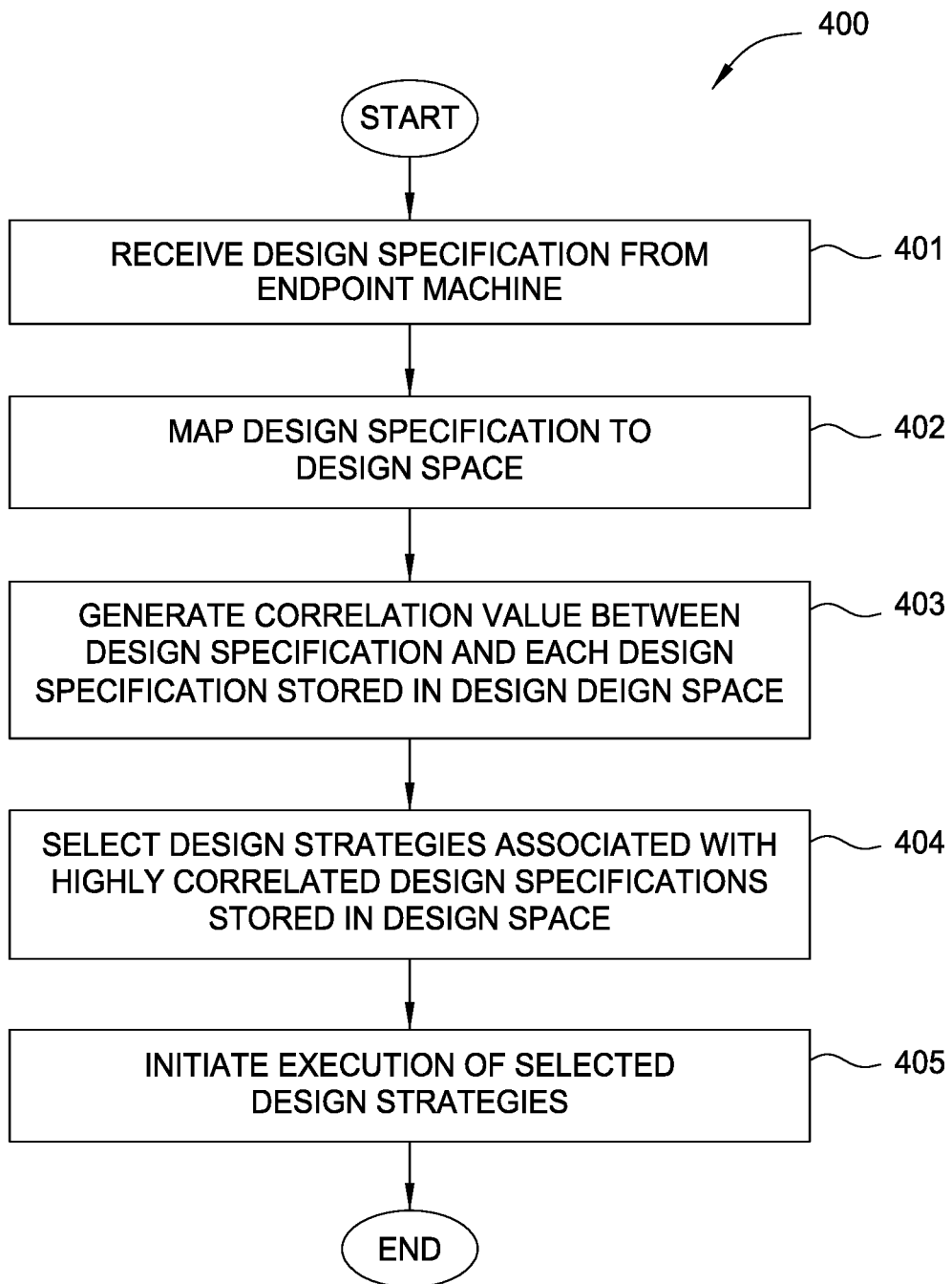
FIG. 4 is a flow diagram of method steps for selecting a design strategy, according to one embodiment of the present invention.

FIG. 4 is a flow diagram of method steps for selecting a design strategy, according to one embodiment of the present invention. Although the method steps are described in conjunction with the system of FIGS. 1-3, persons skilled in the art will understand that any system configured to perform the method steps, in any order, is within the scope of the present invention.

As shown, a method 400 begins at step 401, where classification engine 204 within design engine 124 receives design specification 115 from interface engine 114 within endpoint machine 110. At step 402, classification engine 204 maps design specification 115 into design space 141. Design space 141 includes stored design specifications 207 and corresponding stored design strategies 208 previously implemented to generate geometries for those stored design specifications 207.

At step 403, classification engine 204 generates a correlation value between design specification 115 and each stored design specification 207 within design space 141. Classification engine 204 could compare objectives 200, environment 201, constraints 202, and/or style cues 203 with corresponding attributes of stored design specifications 207 to compute the correlation value described herein. At step 404, classification engine 204 identifies stored design strategies 208 associated with any stored design specifications 207 determined to be highly correlated with design specification 115. As referred to herein, a stored design specification 207 may be "highly correlated" with design specification 115 when a correlation value generated between those two design specifications exceeds a threshold value. At step 405, classification engine 204 initiates the execution of the stored design strategies selected at step 404. In doing so, classification engine 204 transmits the selected design strategies 208 to execution engine 205 for execution. The method 400 then ends.

Classification engine 204 may implement the method 400 in order to classify a wide variety of different types of design specifications that reflect a broad spectrum of different design problems. One exemplary application of the method 400 is described in greater detail below in conjunction with FIG. 5.

FIG. 5 illustrates an exemplary design specification that is correlated with stored design specifications residing within the design space of FIG. 1, according to one embodiment of the present invention. As shown, a window design specification 500 includes objectives 501, environment 502, constraints 503, and style cues 504. Window design specification 500 generally reflects a set of attributes associated with a window that an end-user is designing. Objectives 501 indicate that the flux of light afforded by the window design should be maximized. Environment 502 indicates a particular orientation that the window will have. Constraints 503 indicate that the window should be capable of withstanding a minimum amount of stress. Style cues 504 indicate that the window should be rectangular.

Classification engine 204 is configured to map window design specification 500 into design space 141 by generating a correlation value between window design specification 500 and each stored design specification 207. As is shown, design space 141 includes stored design specifications 207-0 through 207-2. In practice, design space 141 includes many more stored design specifications 207, although only three are shown in the present example for the sake of simplicity. Classification engine 204 generates correlation values of 0.2, 0.85, and 0.4 between window design specification 500 and stored design specifications 207-0, 207-1, and 207-2, respectively.

Classification engine 204 may then identify one or more stored design specifications 207 having greater than a threshold correlation value with window design specification 500, and then select the stored design strategies 208-0 through 208-2 associated with that stored design specification. In the example shown, classification engine 204 could identify design specification 207-1 as being "strongly" correlated with window design specification 500, and then select design strategies 208-1. Classification engine 204 would then cause execution engine 205 to execute design strategies 208-1 to generate geometry for window design specification 500. Execution engine 205 may implement a technique for executing stored design strategies that is described in stepwise fashion below in conjunction with FIG. 6.

Executing a Design Strategy

Figure 6:
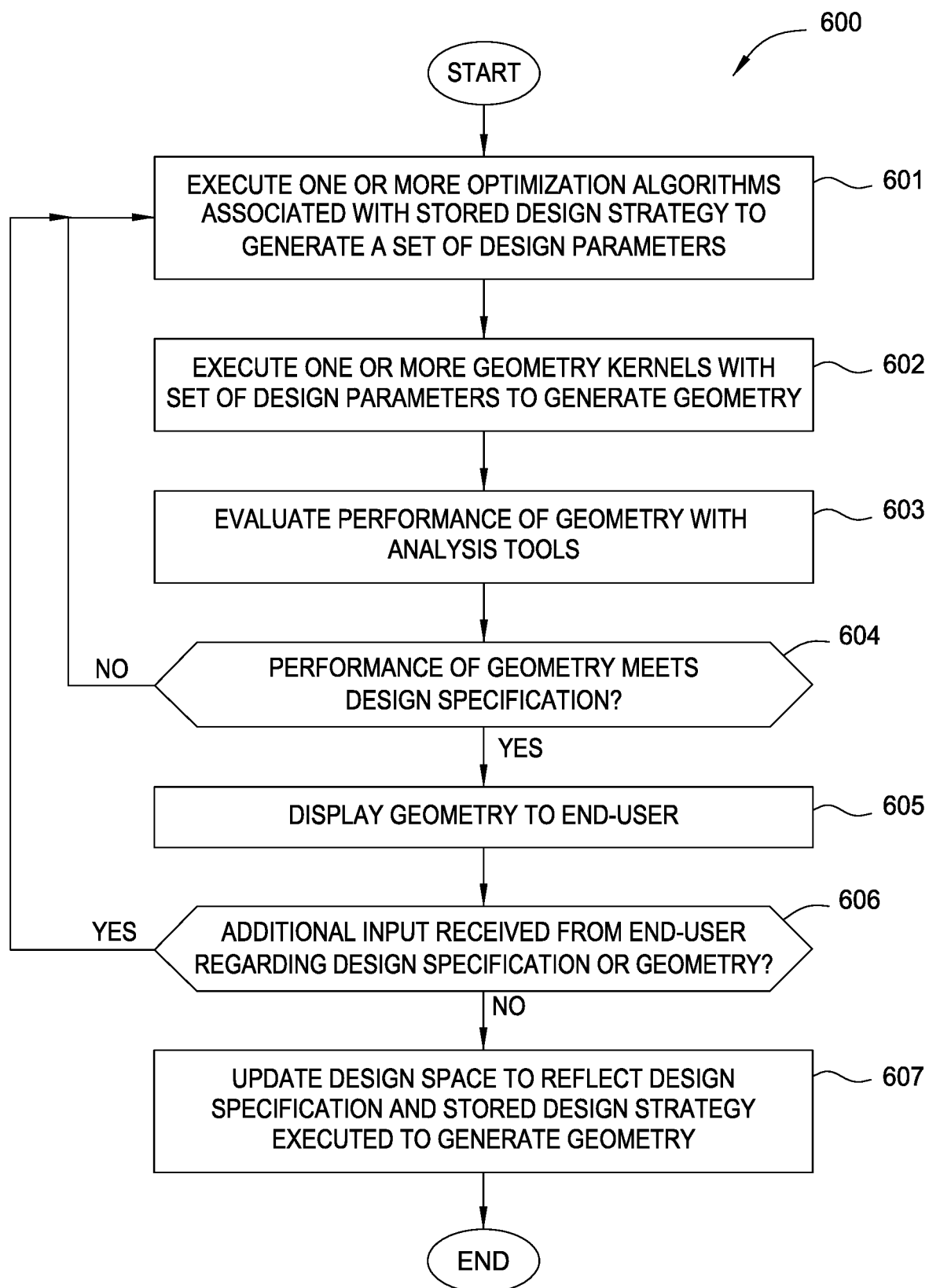
FIG. 6 is a flow diagram of method steps for executing a design strategy to generate geometry that reflects a design specification, according to one embodiment of the present invention.

FIG. 6 is a flow diagram of method steps for executing a stored design strategy to generate geometry that reflects design specification, according to one embodiment of the present invention. Although the method steps are described in conjunction with the system of FIGS. 1-3, persons skilled in the art will understand that any system configured to perform the method steps, in any order, is within the scope of the present invention.

As shown, a method 600 begins at step 601, execution engine 205 executes one or more optimization algorithms 300 within a stored design strategy 208 to generate a set of design parameters. The set of design parameters represents a point in an N-dimensional design space associated design specification 115. A given point in the N-dimensional design space corresponds to a particular combination of parameters that describe the physical shape of a geometry. At step 602, execution engine 205 executes one or more geometry kernels 301 with the set of design parameters to generate geometry that reflects the set of parameters. Each geometry kernel 301 may include a different technique for adding and/or removing material to a 3D volume based on that set of parameters. At step 603, execution engine 205 evaluates the performance of the geometry generated at step 602 via analysis tools 302. Analysis tools 603 are configured to generate performance data that represents the degree to which the geometry meets design specification 115.

At step 604, execution engine 115 determines whether the performance of the generated geometry meets design specification 115. If execution engine 205 determines that the performance of the geometry does not meet design specification 115, then the method returns to step 601 and repeats as described above. In practice, execution engine 205 may perform many iterations of steps 601 through 603 before optimization algorithms 300 converge to a suitable geometry. In addition, execution engine 205 may perform steps 601 through 603 in many parallel cycles, executing different optimization algorithms 300, different geometry kernels 301, and different analysis tools 302 in each parallel cycle to generate many different geometries. Once a geometry or geometries has been discovered that meets design specification 115, then the method 600 proceeds to step 605.

Figure 8A:
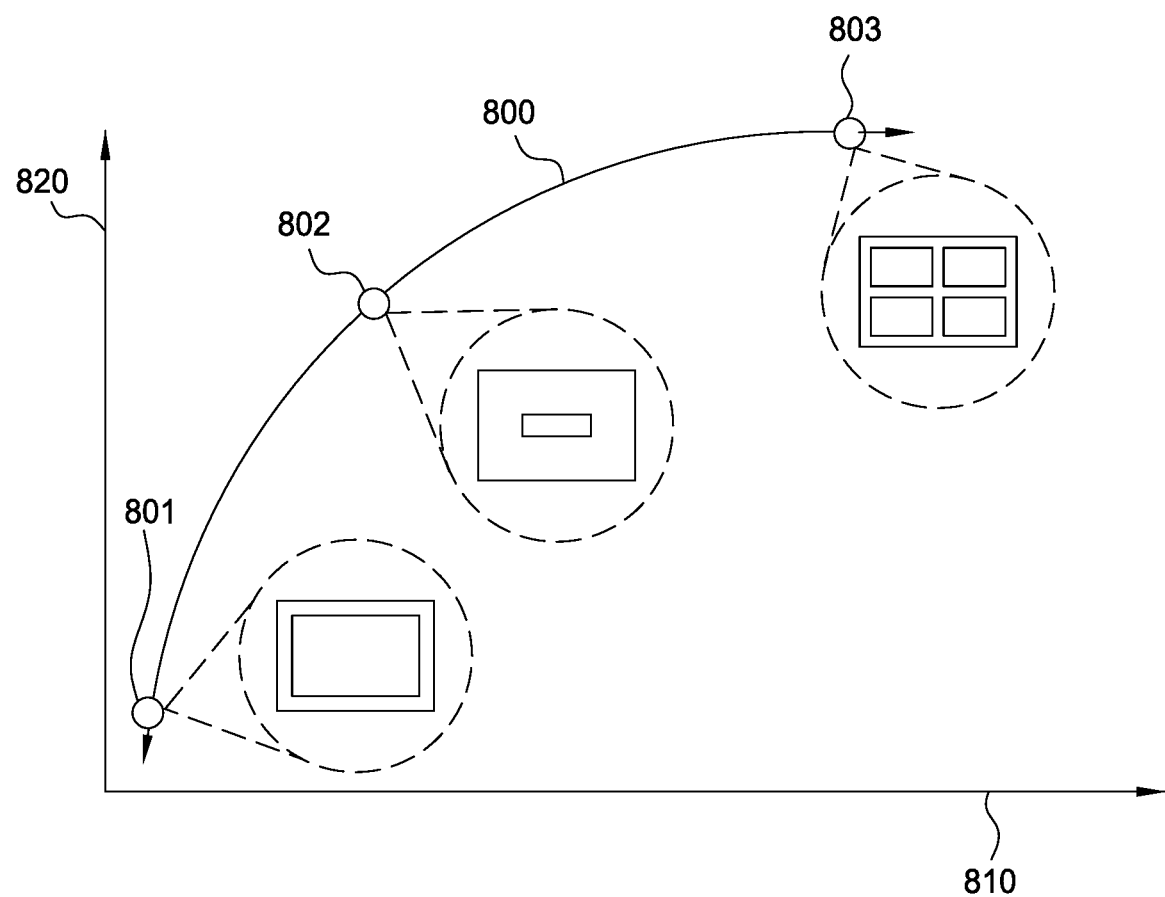
FIGS. 8A-8C illustrate different graphical user interface (GUI) elements that interface engine of FIG. 1 may generate to display attributes of geometries, according to one embodiment of the present invention.

At step 605, interface engine 114 displays the generated geometries to the end-user. FIGS. 8A-9 illustrate different GUI elements that interface engine 114 may generate to display geometries to the end-user. At step 606, design engine 124 may receive additional input from the end-user that represents modification to design specification 115 or explicit changes to the display geometries. In cases where such input is received at step 606, the method returns to step 601 and begins again. Otherwise, if design engine 124 does not receive additional input at step 606, indicating that the end-user is satisfied with the generated geometries, then the method 600 proceeds to step 607. At step 607, design engine 124 updates design space 141 to reflect design specification 115 as well as the stored design strategies 208 executed to generate the final geometry. The method 600 then ends.

FIG. 7, described in greater detail below, illustrates an exemplary set of geometries that execution engine 205 may generate when performing the method 600. Those geometries may reflect window design specification 500 shown in FIG. 5.

FIG. 7 illustrates exemplary geometries that reflect the design specification of FIG. 5, according to one embodiment of the present invention. As shown, window geometries 700, 710, and 720 represent different window geometries. As also shown, each such window geometry is associated with a different set of analysis results. Window geometry 700 is associated with analysis results 701, window geometry 710 is associated with analysis results 711, and window geometry 720 is associated with analysis results 721.

Execution engine 205 may generate each of window geometries 700, 710, and 720 by executing one or more optimization algorithms 300 and geometry kernels 301. In the example shown, the executed optimization algorithms 300 could explore a 2D design space that represents various window cross-sections. The executed geometry kernels 301 could add or remove portions of a 2D plane in order to generate window geometries 700, 710, and 720, among other techniques. Execution engine 205 generates analysis results 701, 711, and 721 by way of analysis tools 302. Each such analysis result specifies a light flux value afforded by the corresponding widow geometry and the maximum stress the corresponding geometry can endure. In this example, execution engine 205 could execute an analysis tool 302 to evaluate the flux of light, including, e.g., a ray tracing program, among other possibilities. Execution engine 205 could also execute another analysis tool 302 to evaluate the structural integrity of each window geometry, including, e.g., a structural simulator, thereby computing the maximum allowable stress for each such geometry.

Execution engine 205 thus generates multiple window geometries and then generates analysis results for each such geometry. The analysis results may reveal different design tradeoffs associated with the spectrum of window geometries. Specifically, analysis results 701 reveal that window geometry 700 has a very high maximum stress, at the expense of a very low flux value. Conversely, window design 710 has a very high flux value, at the expense of having a very low maximum stress value. However, window geometry 720 has a medium flux value as well as a medium maximum stress value. Window geometry 720 thus represents a tradeoff between flux and maximum stress that may meet objectives 501 (maximize flux) while also satisfying constraints 503 (minimum stress value).

With the approach described herein by way of example, execution engine 205 is configured to identify a range of different geometries and to analyze the various tradeoffs associated with each such design. Execution engine 205 may perform the above approach iteratively, thereby evaluating each window design during each iteration. Upon identifying a suitable set of window geometries that meet design specification 115, execution engine 205 may then pass those results to interface engine 115 for display to the end-user. Interface engine 114 is configured to generate various GUI elements to display the generated geometries, as described in greater detail below in conjunction with FIGS. 8A-9.

Visualizing Design Geometries

FIG. 8A illustrates an exemplary GUI element for displaying attributes of geometries generated by design engine 124, according to one embodiment of the present invention. Interface engine 114 may generate the GUI element of FIG. 8A upon receiving a set of geometries from execution engine 205. As shown, a fitness curve 800 is plotted against axes 810 and 820. Fitness curve 800 includes various positions 801, 802, and 803 that represent particular geometries. For example, positions 801, 802, and 803 could correspond to window geometries 710, 700, and 720, of FIG. 7, respectively, as is shown.

Figure 8B:
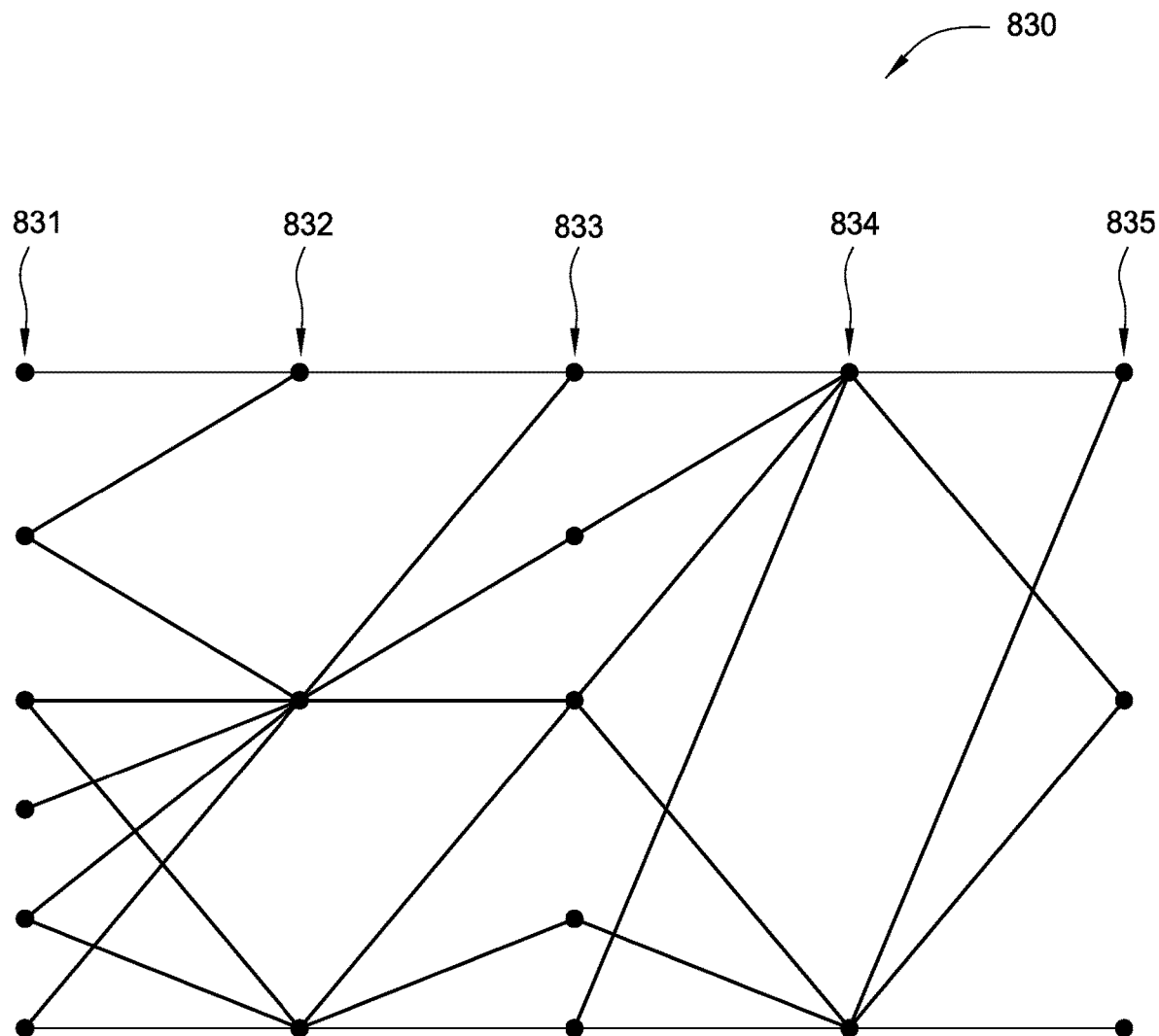
Figure 9:
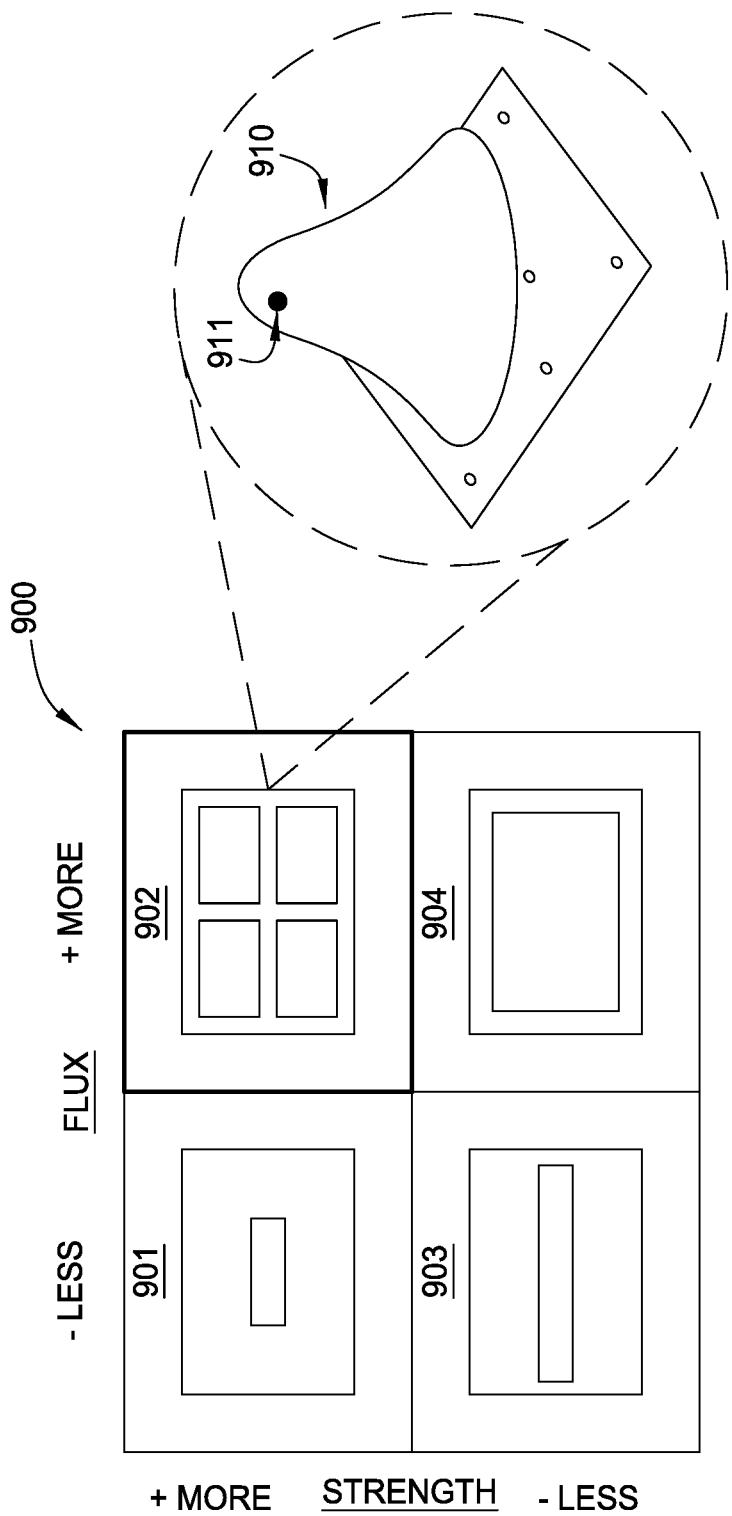
FIG. 9 illustrates a tool that allows an end-user to traverse design options generated by the design engine of FIG. 1, according to one embodiment of the present invention.

FIG. 8B illustrates another exemplary GUI element for displaying attributes of geometries generated by design engine 124, according to one embodiment of the present invention. Similar to above, interface engine 114 may generate the GUI element of FIG. 8B upon receiving a set of geometries from execution engine 205. As shown, a design tree 830 includes design choices 831 through 835. A given design choice includes a set of nodes that represent different outcomes to that design choice. Thus, each continuous line across design choices 831 through 835 represents the complete set of design choices for a given geometry.

Figure 8C:
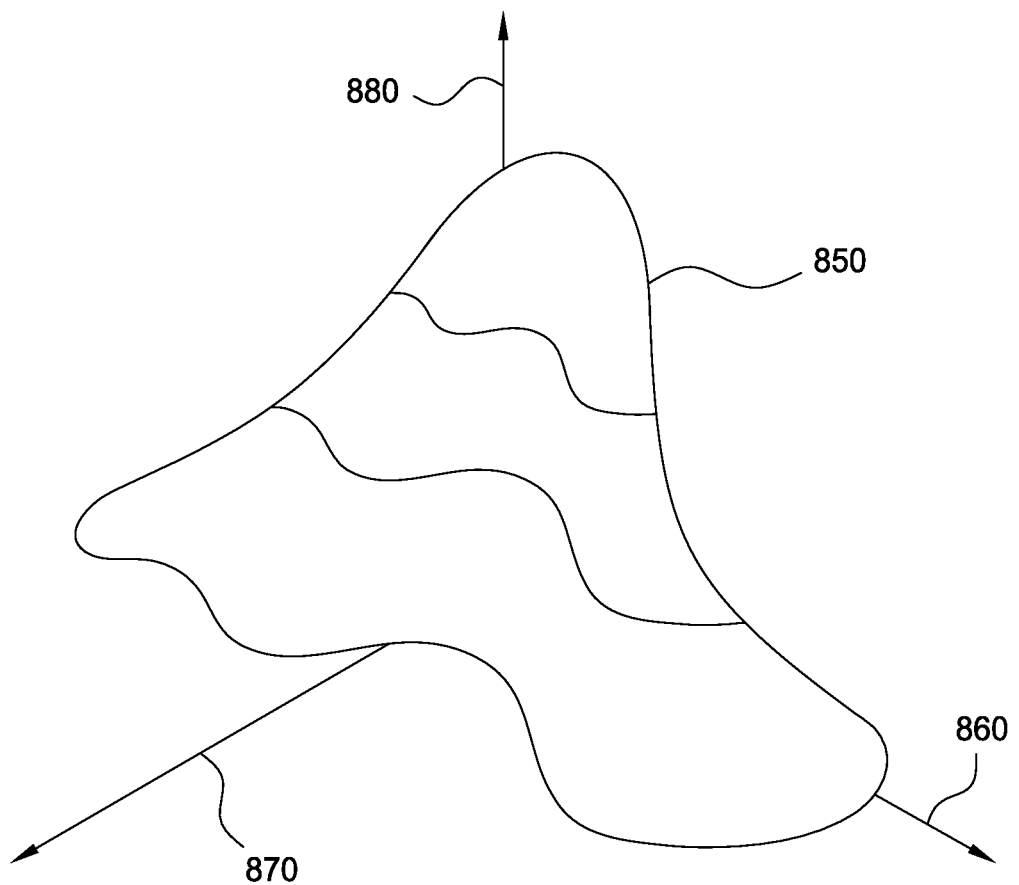

FIG. 8C illustrates another exemplary GUI element for displaying attributes of geometries generated by design engine 124, according to one embodiment of the present invention. Similar to above, interface engine 114 may generate the GUI element of FIG. 8C upon receiving a set of geometries from execution engine 205. As shown, a design surface 850 is plotted against axes 860, 870, and 880. Design surface 850 could represent the N-dimensional design space associated with design specification 115, where each point on that surface corresponds to a single geometry.

Referring generally to FIGS. 8A-8C, interface engine 114 may generate the different GUI elements discussed in those figures in order to provide a graphical depiction of the tradeoffs accomplished by the different geometries generated by design engine 124. Interface engine 114 may also allow the end-user to interact with a GUI element in order to traverse design options associated with those geometries, as described in greater detail below in conjunction with FIG. 9.

FIG. 9 illustrates a tool that allows an end-user to traverse design options generated by the design engine of FIG. 1, according to one embodiment of the present invention. As shown, a GUI panel 900 includes design variations 901, 902, 903, and 904. Each such design variation represents a different geometry. In the example shown, design variations correspond to different window geometries. GUI panel 900 organizes those design variations according to the analysis results execution engine 205 generates for those variations. In the window example, the analysis results provide flux values and maximum stress values. Accordingly, GUI panel 900 displays the window design variations 901 through 904 organized according to those results in order to illustrate the tradeoffs between those different variations.

Interface engine 114 is also configured to generate N-dimensional design space 910 and to position each design variation in that N-dimensional design space. As shown, a position 911 corresponds to design variation 902. The end-user may traverse N-dimensional design space 910 in order to identify design options not currently shown or not yet generated by design engine 124. With this approach, the end-user is provided with an interactive tool for identifying geometries with a particular combination of attributes.

Persons skilled in the art will recognize that the various GUI elements described thus far in conjunction with FIGS. 8A-9 are provided for exemplary purposes only. As a general matter, interface engine 114 may generate a wide variety of GUI elements that provide simple display functionality, as described above in conjunction with FIGS. 8A-8C, or more complex GUI elements that provide interactive capabilities, as described in conjunction with FIG. 9.

In sum, a centralized design engine receives a problem specification from an end-user and classifies that problem specification in a large database of previously received problem specifications. Upon identifying similar problem specifications in the large database, the design engine selects design strategies associated with those similar problem specifications. A given design strategy includes one or more optimization algorithms, one or more geometry kernels for generating novel geometry and one or more analysis tools for analyzing the performance of that geometry. The design engine then executes the optimization algorithms to generate a set of parameters that reflect a design. The design engine then executes the geometry kernels to generate a spectrum of geometries based on the set of parameters, and generates analysis results for each geometry in that spectrum. The optimization algorithms may then improve the generated geometries based on the analysis results in an iterative fashion. When a suitable spectrum of geometries is discovered, the design engine then displays the spectrum of geometries to the end-user, along with the analysis results.

Advantageously, geometries generated by the design engine may be more likely to achieve global optima compared to traditional approaches. Further, the design engine is cloud-based and highly parallelized, and so geometries can be generated much faster than conventional approaches. Since each design cycle may occur in a fraction of the time required by conventional design cycles, and each such cycle may yield many more potential designs than conventional design cycles, the overall design process may be accelerated.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A computer-implemented method for generating geometry, the method comprising:
   receiving, via a user interface, a design specification that defines a set of requirements for a physical component, wherein the set of requirements comprises at least one of a set of objectives that the physical component should meet, a set of environmental parameters associated with a physical environment of the physical component, a set of constraints that the physical component should not violate, or a set of style cues that should be reflected by a form factor associated with the physical component;
   identifying, from a database that includes a plurality of stored design specifications and a plurality of stored design strategies used to generate the plurality of stored design specifications, a set of stored design specifications having at least a threshold correlation with the design specification;
   selecting, from the database, a set of stored design strategies used to generate the set of stored design specifications, wherein the set of stored design strategies includes one or more operations to procedurally generate geometry by at least one of adding virtual material to or removing virtual material from a three-dimensional (3D) volume;
   executing at least the one or more operations to generate geometry for the physical component that is consistent with the design specification; and
   displaying, via the user interface, the geometry for the physical component, wherein the interface permits modification of at least one of the geometry or the design specification.

2. The computer-implemented method of claim 1, wherein the set of stored design strategies further includes one or more optimization operations, and the method further comprises executing the one or more optimization operations to generate a set of shape and size parameters used in the one or more operations to the generate the geometry.

3. The computer-implemented method of claim 1, wherein identifying the set of stored design specifications comprises:
   computing a distance between the design specification and each of the plurality of stored design specifications; and
   selecting the set of stored design specifications that are within a threshold distance of the design specification.

4. The computer-implemented method of claim 1, wherein each stored design specification included in the set of stored design specifications has been used to generate geometry for a physical component corresponding to the stored design specification.

5. The computer-implemented method of claim 1, further comprising executing at least one of one or more physical simulation operations, one or more design validation operations, or one or more design evaluation operations to determine a degree to which the geometry for the physical component meets one or more requirements of the design specification.

6. The computer-implemented method of claim 5, further comprising executing one or more optimization operations based on the degree to generate a set of shape and size parameters, wherein the set of shape and size parameters are used in the one or more operations to the generate the geometry.

7. The computer-implemented method of claim 1, wherein the set of stored design specifications are stored in the database, and the method further comprises updating the database to store the design specification and an association between the design specification and at least one design strategy included in the set of stored design strategies.

8. The computer-implemented method of claim 1, further comprising parsing the design specification by executing at least one of one or more natural language processing operations, one or more semantic analysis operations, or one or more interpretation operations on the design specification.

9. The computer-implemented method of claim 1, wherein the geometry for the physical component is displayed in the user interface as at least one of a position on a fitness curve, a node of a design tree, or a point on a design surface.

10. The computer-implemented method of claim 1, further comprising:
    executing one or more additional operations included in the set of stored design strategies to generate additional geometry for the physical component that is consistent with the design specification; and
    displaying, via the user interface, the additional geometry for the physical component alongside the geometry for the physical component.

11. One or more non-transitory computer-readable storage media including instructions that, when executed by at least one processor, cause the at least one processor to perform steps for generating geometry, the steps comprising:

receiving, via a user interface, a design specification that defines a set of requirements for a physical component, wherein the set of requirements comprises at least one of a set of objectives that the physical component should meet, a set of environmental parameters associated with a physical environment of the physical component, a set of constraints that the physical component should not violate, or a set of style cues that should be reflected by a form factor associated with the physical component;

identifying, from a database that includes a plurality of stored design specifications and a plurality of stored design strategies used to generate the plurality of stored design specifications, a set of stored design specifications having at least a threshold correlation with the design specification;

selecting, from the database, a set of stored design strategies used to generate the set of stored design specifications, wherein the set of stored design strategies includes one or more operations to procedurally generate geometry by at least one of adding virtual material to or removing virtual material from a three-dimensional (3D) volume;

executing at least the one or more operations to generate geometry for the physical component that is consistent with the design specification; and displaying, via the user interface, the geometry for the physical component, wherein the user interface permits modification of at least one of the geometry or the design specification.

12. The one or more non-transitory computer-readable storage media of claim 11, wherein the set of stored design strategies further includes one or more optimization operations, and the instructions, when executed by the at least one processor, further cause the at least one processor to perform the step of executing the one or more optimization operations to generate a set of shape and size parameters used in the one or more operations to the generate the geometry.

13. The one or more non-transitory computer-readable storage media of claim 11, wherein, to identify the set of stored design specifications, the at least one processor performs the steps of:

computing a distance between the design specification and each of the plurality of stored design specifications; and selecting the set of stored design specifications that are within a threshold distance of the design specification.

14. The one or more non-transitory computer-readable storage media of claim 11, wherein the instructions, when executed by the at least one processor, further cause the at least one processor to perform the step of executing at least one of one or more physical simulation operations, one or more design validation operations, or one or more design evaluation operations to determine a degree to which the geometry for the physical component meets one or more requirements of the design specification.

15. The one or more non-transitory computer-readable storage media of claim 11, wherein the set of stored design specifications are stored in the database, and the instructions, when executed by the at least one processor, further cause the at least one processor to perform the step of updating the database to store the design specification and an association between the design specification and at least one design strategy included in the set of stored design strategies.

16. The one or more non-transitory computer-readable storage media of claim 11, wherein the one or more operations to generate geometry include one or more operations that at least one of add one or more voxels or remove one or more voxels from a voxel space.

17. The one or more non-transitory computer-readable storage media of claim 11, wherein the one or more operations to generate geometry include one or more operations that remove virtual material along a radially symmetric path.

18. The one or more non-transitory computer-readable storage media of claim 11, wherein the one or more operations to generate geometry include one or more operations that correspond to one or more steps of a manufacturing process.

19. The one or more non-transitory computer-readable storage media of claim 11, wherein the instructions, when executed by the at least one processor, further cause the at least one processor to perform the steps of:

executing one or more additional operations included in the set of stored design strategies to generate additional geometry for the physical component that is consistent with the design specification; and displaying, via the user interface, the additional geometry for the physical component alongside the geometry for the physical component.

20. A system, comprising:

one or more memories storing instructions; and one or more processors that are coupled to the one or more memories and, when executing the instructions, are configured to:

receive, via a user interface, a design specification that defines a set of requirements for a physical component, wherein the set of requirements comprises at least one of a set of objectives that the physical component should meet, a set of environmental parameters associated with a physical environment of the physical component, a set of constraints that the physical component should not violate, or a set of style cues that should be reflected by a form factor associated with the physical component, identify, from a database that includes a plurality of stored design specifications and a plurality of stored design strategies used to generate the plurality of stored design specifications, a set of stored design specifications having at least a threshold correlation with the design specification, select, from the database, a set of stored design strategies used to generate the set of stored design specifications, wherein the set of stored design strategies includes one or more operations to procedurally generate geometry by at least one of adding virtual material to or removing virtual material from a three-dimensional (3D) volume, execute at least the one or more operations to generate geometry for the physical component that is consistent with the design specification, and display, via the user interface, the geometry for the physical component, wherein the interface permits modification of at least one of the geometry or the design specification.

* * * * *